United States Patent [19]

da Costa

[11] Patent Number: 4,981,487

[45] Date of Patent: Jan. 1, 1991

[54] COLORED HYDROGEL OBJECTS AND THEIR PRODUCTION-CONTAINING A WATER-INSOLUBLE OPAQUING AGENT

[75] Inventor: Nicholas M. da Costa, Wellhead, England

[73] Assignee: Igel International Ltd., Leighton Buzzard Bedfordshire, England

[21] Appl. No.: 344,557

[22] Filed: Apr. 26, 1985

[30] Foreign Application Priority Data

Dec 19, 1986 [GB] United Kingdom ............... 8630363

Related U.S. Application Data

[63] Continuation of Ser. No. 134,048, Dec. 17, 1987.

[51] Int. Cl.$^5$ ............... D06P 5/00; D06P 3/00; C08J 3/20; C02C 7/04
[52] U.S. Cl. ................................. 8/507; 8/543; 8/625; 8/629; 8/650; 8/651
[58] Field of Search ............................. 8/507

[56] References Cited

U.S. PATENT DOCUMENTS

| | | | |
|---|---|---|---|
| 3,476,499 | 11/1969 | Wichterle | 8/619 |
| 3,679,504 | 7/1972 | Wichterle | 156/62 |
| 4,494,954 | 1/1985 | Suminoe et al. | 8/507 |
| 4,518,390 | 5/1985 | Rabenau et al. | 8/507 |
| 4,559,059 | 12/1985 | Su | 8/507 |
| 4,559,897 | 12/1985 | Urrea et al. | 118/406 |
| 4,582,402 | 4/1986 | Knapp | 351/162 |
| 4,634,449 | 1/1987 | Jenkins | 8/507 |
| 4,702,574 | 10/1987 | Bawa | 8/507 |

FOREIGN PATENT DOCUMENTS

| | | |
|---|---|---|
| 122771 | 10/1984 | European Pat. Off. . |
| 58-136882 | 8/1983 | Japan . |
| 1004424 | 9/1965 | United Kingdom . |
| 1583492 | 1/1981 | United Kingdom . |

*Primary Examiner*—A. Lionel Clingman
*Attorney, Agent, or Firm*—Lewis H. Eslinger

[57] ABSTRACT

Shaped organic polymer hydrogels, especially contact lenses, are provided with opaque or translucent coloring so as to be capable of masking effectively any underlying color, e.g. the natural color of the eye. The hydrogel may be rendered opaque by precipitation in situ of a white or yellow water-insoluble, inorganic or organic material e.g. barium sulphate or an optical brightener and then colored with a suitable dyestuff.

10 Claims, No Drawings

COLORED HYDROGEL OBJECTS AND THEIR PRODUCTION-CONTAINING A WATER-INSOLUBLE OPAQUING AGENT

This is a continuation of application Ser. No. 07/134,048, filed 12-17-87.

The invention relates to colouring hydrogel objects to introduce colours desired for either protective masking or cosmetic purposes, and more particularly to colouring medical devices, such as ophthalmic contact lenses, for cosmetic or prosthetic reasons, or to protect the eyes from excessive light.

Several methods have been previously used to colour water-absorbent plastic articles using solvent, azoic and vat dyes, see, for example the following patents:

| | |
|---|---|
| MESHEL | British Patent No. 1,547,525 (1979); |
| KOBERLEIN | U.S. Pat. No. 2,524,811 (1950); |
| BRISTOL & SHERE | U.S. Pat. No. 3,519,462 (1970); |
| WICHTERLE | U.S. Pat. No. 3,679,504 (1972); |
| TANKA | U.S. Pat. No. 4,157,892 (1979). |

One of the main drawbacks of the processes of the above-mentioned patents, is that the colours produced are transparent. Consequently if an article such as a hydrogel contact lens is coloured in one of these ways, the effects obtainable are strictly limited. More particularly, if it is desired to change the colour of an eye, the colour obtained is the resultant of a combination of the natural colour of the eye and the colour of the contact lens. For example, a contact lens tinted with a transparent green colour will produce significantly different colour effects when placed on blue, green or grey eyes. Furthermore, it is not possible with such transparent coloured articles to produce any dramatic colour changes on people with dark eyes, such as brown or hazel eyes. Their use is consequently limited to light coloured eyes such as blue, green or grey eyes.

It has been proposed in U.S. Pat. No. 3,476,499 (Wichterle) to precipitate an insoluble material in a hydrogel-type lens so as to absorb light. For example an impregnating agent is applied to one face of such a lens and a precipitating agent to the opposite face so that the two agents interact within the lens to form a solid water-insoluble precipitate. However it is disclosed that it is not always easy to obtain a precipitate of the desired density. For example if barium chloride solution is first applied to a hydrogel lens followed by sulphuric acid, most of the expected precipitate forms on the lens surface and can readily be removed by wiping.

The present invention provides a method for colouring hydrogels and in particular for producing opaque or translucent colourations in a transparent hydrogel article. As compared with the process of U.S. Pat. No. 3476499, the new process is more reliable and more flexible. While the following description relates mainly to colouring hydrogel contact lenses, it will be understood that the method of the invention can in principle be used to colour any shaped article made of an organic polymer hydrogel. Using the new method it is possible to change the colour of any eye, whether brown, blue, hazel, green, grey or any other colour. This is achieved by introducing into a contact lens components which both provide the desired tint, and mask the colour of the natural eye, so that only the colour of the tint is effective. These components must be translucent or opaque to light in order to achieve this effect and must be capable of being formed in a hydrogel matrix and be capable, in the case of a hydrogel contact lens, of standing up to the cleaning or disinfecting regimes used in their care, and must not leach out of the lens matrix. They must also, of course, be physiologically innocuous. Preferably these components are not applied to the whole surface of the hydrogel, but only to selected areas, and especially an area corresponding to the iris of the eye, using suitable application, e.g. masking or printing, techniques.

The invention accordingly provides shaped organic polymer hydrogels containing within the gel an opaque or translucent, physiologically innocuous water-insoluble material in an amount sufficient to render at least part of the said hydrogel opaque or translucent, and a colouring agent for the hydrogel in at least part of the areas which have been rendered opaque or translucent by the said water-insoluble material. The opaque or translucent water-insoluble material may itself be slightly tinted, but the tint is mainly or completely provided by a separate material, and more particularly by a disperse, solvent, vat, azo, or reactive dyestuff.

The invention also provides a method of making such a hydrogel which comprises applying to a shaped organic polymer hydrogel a solution of a water-insoluble material or a precursor therefor under conditions such that the said solution penetrates substantially into the hydrogel, and then an agent to precipitate the water-insoluble material in situ in the hydrogel and colouring at least part of the area in which the precipitate forms before, during, or after the formation of the said precipitate. It is important to ensure that the first solution substantially generates the hydrogel so that the precipitate is formed within, and not on, the hydrogel surface. With hydrogels containing large amounts of water, such penetration is automatic. With other hydrogels it may be necessary to include in the first solution a swelling agent for the hydrogel which swells the hydrogel more than water to ensure that adequate penetration by the solution takes place. Suitable swelling agents include alcohols such as methanol or ethanol, acetone, ethylene glycol monomethylether and dimethylformamide.

The hydrogel material to which the invention is applied may be any known organic polymeric hydrogel of the kind out of which contact lenses are made, but is preferably a hydrogel as described and claimed in our British Specification No. 2087408. Such hydrogels combine a high water content and adequate mechanical properties with a low degree of cross-linking corresponding to less than 1% of cross-linking agent in many cases.

An aqueous solution of a water-soluble salt may be first applied to the hydrogel followed by a solution of a second reagent which reacts with the salt to produce a water-insoluble, opaque or translucent, physiologically innocuous precipitate. Suitable water-soluble salts are barium salts such as the chloride or nitrate, in which case the second reagent may be sulphuric acid or a water-soluble sulphate which reacts with the barium salt to produce white, highly water-insoluble barium sulphate.

In an alternative method a solution of a water-insoluble material in an organic solvent capable of penetrating the hydrogel may be applied to the hydrogel and the water-insoluble material then precipitated in situ by application of water to the hydrogel. This method is preferred when the water insoluble material is organic.

Whichever method is used, the temperature at which the opaque precipitate is formed in the hydrogel is not critical and may be for example a temperature from ambient temperature up to 5° C. lower than the boiling point of the reaction medium.

The treatment may be repeated if necessary to increase the opacity of the precipitate formed. Generally speaking the amount of water-insoluble material should be sufficient to mask the natural colour of the eye.

The invention is especially useful for making coloured contact lenses in which an area corresponding to the iris of the eye is coloured and areas corresponding to the pupil and the periphery of the lens are left transparent. Because the iris area is opaque, the new contact lenses are able to mask the natural colour of the eye and thus provide the possibility of lightening the eyes cosmetically. Similarly the new contact lenses may be used to mask eyes which are unnatural in appearance e.g. as a result of injury. In the latter case, the part overlaying the pupil should be dark coloured and preferably opaque.

The opaque or translucent material can be applied to the hydrogel before, after, or together with the colouring material, and the latter may be applied to the same areas as, or at least partly to areas different from, those covered by the opaque or translucent material.

A wide variety of inorganic or organic materials can be used as the opaque or translucent component. In principle any material which is opaque to light, or substantially opaque, which is physiologically innocuous and which is not leached from the lens by the eye secretions, can be used. The preferred inorganic compounds are water- insoluble metal compounds such as hydroxides, chlorides, oxides, sulphates, or sulphides of metals, such as aluminium, calcium, barium, silver, or titanium. The colour of the material must be compatible with the colour effect desired, and for this reason the preferred components are those which are white to yellow in colour. A preferred compound is barium sulphate, which can be precipitated as a white, non-toxic, water-insoluble solid in a hydrogel matrix by first soaking the matrix in an aqueous or aqueous/alcoholic (e.g. aqueous methanolic) barium chloride solution and then precipitating $BaSO_4$ by soaking the matrix in dilute sulphuric acid.

The preferred organic compounds are fluorescent or optical brighteners which are insoluble in water, but preferably solvent soluble, and white to yellow in colour. Various types of fluorescent brighteners are listed in KIRK OTHMER, ENCYCLOPEDIA OF CHEMICAL TECHNOLOGY, VOL 4 Pages 213-226. Translucent to opaque precipitates in hydrogels can be obtained from fluorescent brighteners including, for example, those marketed under the trade names, Leucopure, Hostalux, Multraphor, Uvitex and Fluolite, which are relatively insoluble in water but soluble in organic solvents.

Suitable dyes which can be used to tint the hydrogels are Procion Turquoise SP-26, Procion Blue P-GR, Procion Brown P-GR, Procion Orange P-2R, CI Solubilized Vat Orange 5, CI Solubilized Vat Blue 6, CI Solubilized Vat Green 1, CI Solubilized Vat Brown 1, CI Dispersol Violet 28, Savinyl Blue GLS, Savinyl Green 2GLS, and Waxoline Red GPFW. For a natural effect the colouring agent should be applied in such a way that the intensity of colour is essentially constant over the whole of the coloured area apart from any deliberate patterning that may be introduced.

If desired patterns may be incorporated into the opaque material and/or the colouring agent, in order better to simulate the natural appearance of the eye. For example, by using standard printing (especially screen, pad or ink-jet printing) techniques, the opaque material may be formed in a pattern in the hydrogel. Such a pattern may be of continuous, straight, curved or zigzag lines or of solid shapes such as triangles, parabolas, ellipses, or rectangles. The colouring may take place before or after such a printing operation. Similarly the colouring agent may be deposited as a pattern in a similar way and using similar techniques. Moreover, more than one colouring agent can be used.

For example a contact lens coloured in accordance with the invention may be further coloured by applying a different transparent dyestuff to deposit a pattern over the iris section. To resemble the natural iris pattern, this second dyestuff is preferably a dark shade, e.g. black, grey, navy blue or brown. It may be applied by standard printing techniques. This pattern may be solid, continuous or intermittent, and should preferably cover at least 5 percent of the tinted erea. By using this technique, the colour of the contact lens in use will be the resultant of the transparent tint enhanced with the pattern of the second transparent colour. Moreover if the opaque backing is patterned, it adds to the combined effect.

The invention is illustrated by the following Examples:

EXAMPLE 1

A saturated aqueous solution of barium chloride was applied to a hydrogel contact lens, based on a copolymer of N-vinyl-pyrrolidone and a hydrophobic methacrylate, as described in British Pat. No. 2087408, having a water content of 77%, for 10 minutes. The central 4 mm pupillary area and 2 mm of the outer peripheral area of the lens were masked. The lens was then treated with 2% $H_2SO_4$ solution for 2 minutes. An opaque pattern consisting of a white precipitate of barium sulphate was formed in the lens, the pupillary and peripheral areas of the lens being left clear.

The lens obtained was coloured with a solution of a reactive dye (Procion Green P-4BL) in water for 2 minutes, the pupillary and peripheral areas being masked. A green opaque lens was obtained which had clear pupillary and peripheral areas. This lens was placed on a brown eye and was effective in masking the brown colour and turning the eye to green.

Similar results are obtained if the lens is tinted with other reactive, solubilized vat colours, solvent or disperse dyestuffs dissolved in water or a solvent such as acetone. The different coloured lenses obtained were effective in changing the colour of brown eyes.

EXAMPLE 2

Example 1 was repeated using a saturated barium chloride solution in aqueous 30% or 50% methanol instead of water. A more dense opaque precipitate was obtained, than in Example 1 indicating a deeper penetration of the barium sulphate into the lens matrix, caused by the additional swelling of the hydrogel by the methanol. The opaque lens obtained (after tinting as described in Example 1) was placed on a brown eye and was effective in masking the brown colour.

The same result is obtained if the lens is first tinted and then treated as described in Example 2.

Example 3

An opaque white precipitate was obtained in a 2-hydroxy-ethyl methacrylate hydrogel, having a water content of 38%, using the method described in Example 2. This hydrogel was tinted as described in Example 1 to produce a coloured lens in accordance with the invention.

EXAMPLE 4

Example 2 was repeated using aqueous Aluminium Sulphate or Zinc Chloride solution, followed by Sodium hydroxide solution, to form an opaque precipitate of insoluble Aluminium or Zinc hydroxide in the hydrogel. A mixture of barium sulphate and aluminium hydroxide was also precipitated in the lens using a two stage process.

EXAMPLE 5

An N-vinyl-2-pyrrolidone copolymer hydrogel was steeped in a solution of an optical brightener sold under the trade name Hostalux NSM (0.25g.) in ethylene glycol monomethyl ether (20g.) for 5 minutes. The hydrogel was removed and rinsed in ethylene glycol monomethyl ether for 5 seconds, and then steeped in distilled water. A translucent to opaque yellow deposit was formed in the hydrogel which did not leach out in water. When this hydrogel was tinted with a blue reactive dye, the hydrogel assumed a greenish blue colour, which was successful in masking the colour of a brown eye.

Essentially the same result is obtained if the ethylene glycol monomethyl ether is replaced by dimethylformamide, tetrahydrofuran, acetone, methanol/acetone (50/50), methanol/ethylene glycol monomethyl ether (50/50), or tetrahydrofuran/dimethylformamide (90/10), as solvent for the optical brightener.

The vinyl-pyrrolidone based hydrogel can be replaced by a hydrogel based on 2-hydroxy ethyl methacrylate and the same result obtained.

The reactive dye may be replaced by a vat, solvent or disperse dye to tint the hydrogel.

It is also possible first to apply a disperse, solvent, vat or reactive dye to the hydrogel contact lens and then to render the lens opaque by the method in Example leaving the peripheral and pupillary areas clear. Coloured contact lenses thus obtained were effective in changing the colour of brown eyes to the colour of the lens.

EXAMPLE 6

Example 5 was repeated using the optical brightener sold under the trade name Uvitex OB dissolved in tetrahydrofuran, ethylene glycol monomethyl ether, or dimethylformamide. The solution was applied to a hydrogel contact lens to produce a translucent to opaque off-white pattern, the pupillary and peripheral areas of the lens being masked. Examples of these lenses were tinted with Vat, reactive, solvent or disperse dyes to produce tinted lenses which were capable of masking a brown eye.

EXAMPLE 7

A coloured opaque lens was obtained by dissolving both the optical brightener sold under the trade name Hostalux NSM and a solvent blue dyestuff in acetone and applying the mixture to a hydrogel contact lens having a water content of 67% to produce, after precipitation of the optical brightener and the dyestuff, a coloured contact lens capable of changing the colour of a brown eye.

EXAMPLE 8

An opaque white pattern consisting of a mixture of barium sulphate and the optical brightener Uvitex OB was produced in a hydrogel contact lens using a two stage precipitation process as described in Examples 2 and 6. The lens obtained was then tinted with a reactive, vat, solvent, or disperse dye to produce an opaque, coloured hydrogel lens capable of changing the colour of brown eyes.

All the lenses described in the above Examples were capable of effectively masking the colour of blue, green, grey or hazel eyes as well as brown eyes.

All the dyestuffs disclosed in the above Examples were applied to the hydrogel by standard techniques employed in the dyeing or printing industry, viz. dissolving the colourant in water and/or a solvent which is capable of swelling the hydrogel, applying the dye solution to selected areas of the hydrogel for a fixed time, followed by evaporating the solvent, or fixing or oxidizing the colourant to render it, in the hydrogel matrix, insoluble in water.

EXAMPLE 9

The iris section of an opaque coloured contact lens produced in accordance with any of the Examples 1 to 8 was overprinted with a pattern of radiating straight lines by a screen printing process. This was achieved by dissolving 5% solubilized vat Brown dyestuff in hot water with 2% corn starch, and allowing the mixture to cool at room temperature to a paste which could be screen printed onto the hydrogel lens using a doctor blade. The screen was removed, and the lens allowed to stand for 10 minutes and then oxidized in a solution of 2% sulphuric acid containing sodium nitrite to regenerate the parent vat dye. An opaque coloured lens with patterned brown lines was obtained.

This Example was repeated using other viscosity enhancing agents, e.g. cellulose derivatives, alginates, gums, glycerol, other starches instead of corn starch, in a quantity to prevent the colour spreading or smudging after removing the screen, to produce patterns on the lens.

Pad printing or ink jet printing may be used in place of screen printing.

EXAMPLE 10

Example 9 was repeated using other classes of dyestuffs such as reactive, solvent, or disperse dyestuffs using the appropriate solvent to dissolve the dyestuff and a compatible viscosity enhancing agent to obtain similar patterns on the lenses.

EXAMPLE 11

Example 9 was repeated using other patterns such as curved or zig-zag or intermittent broken lines or solid shapes such as triangles, parabolas, ellipses, circles or rectangles or combinations of the above to obtain a variety of patterned lenses.

EXAMPLE 12

The opaque coloured patterns can also be formed by screen printing, pad printing, or ink jet printing techniques using suitable viscosity enhancing agents as described in Example 9, e.g. as follows.

A paste containing 2% corn starch and 10% barium chloride was made up in hot water and allowed to cool to room temperature. This paste was printed as a pattern consisting of straight parallel radiant lines, on the iris section of a contact lens containing 67% water by a screen printing process. The lens was allowed to stand for 2 minutes and then developed in a 2% sulphuric acid solution to precipitate insoluble barium sulphate in the lens matrix in the form of the applied pattern. These lenses were then tinted with a solvent, reactive, disperse or vat dye as described in the foregoing Examples to give a patterned lens which, when placed on a dark brown eye, was effective in changing the colour of the eye and looked natural.

Pad printing or ink jet printing may be used in place of screen printing.

Other patterns as described in Example 11 can also be obtained. The patterns produced can be made of continuous lines or shapes rather than dotted lines or shapes.

I claim:

1. A shaped organic polymer hydrogel containing within the gel an opaque or translucent, physiologically innocuous, water-insoluble precipitate selected from the group consisting of water-insoluble hydroxides, oxides, sulphates and sulphides of barium, aluminum and zinc in an amount sufficient to render said hydrogel opaque or translucent, and a dye for the hydrogel selected from the group consisting of reactive, solvent, disperse and vat dyes in at least part of those areas containing the said water-insoluble precipitate.

2. A shaped hydrogel according to claim 1 in the form of a contact lens in which the part overlying the iris of the eye is coloured and opaque and the part overlaying the pupil of the eye is transparent.

3. A shaped hydrogel according to claim 2 in which, in the said part overlaying the iris of the eye, the water-insoluble precipitate is opaque, white or pale coloured, and patterned and the dye is uniform or in a pattern.

4. A shaped hydrogel according to claim 1 for cosmetic or prosthetic purposes in the form of a contact lens in which the part overlying the iris of the eye is coloured and opaque and the part overlying the pupil of the eye is dark coloured.

5. Method of making a shaped organic polymer hydrogel containing within the gel an opaque or translucent, physiologically innocuous, water-insoluble precipitate selected from the group consisting of water-insoluble hydroxides, oxides, sulphate and sulphides of barium, aluminum and zinc in an amount sufficient to render said hydrogel opaque or translucent, and a dye for the hydrogel selected from the group consisting of reactive, solvent, disperse and vat dyes in at least part of those areas containing the said water-insoluble precipitate which comprises applying to a shaped organic polymer hydrogel a solution of a precursor of the water-insoluble precipitate under conditions such that the said solution penetrates substantially into the hydrogel, and then an agent which interacts with said precursor to form said water-insoluble precipitate in situ in the hydrogel, and dyeing with a reactive, solvent, disperse or vat dye at least part of the area in which the precipitate is formed before, during or after the formation of the said precipitate.

6. Method according to claim 5 in which a solution of a water-soluble salt of barium, aluminum or zinc is first applied to the hydrogel and a water-insoluble hydroxide, oxide, sulphate or sulphide is then precipitated in the hydrogel by applying thereto a reagent which reacts with the said salt to produce a water-insoluble precipitate.

7. Method according to claim 6, in which the said solution of a water-soluble salt of barium, aluminum or zinc includes as swelling agent for the said hydrogel, methanol, ethanol, acetone, ethylene glycol monomethyl ether, or dimethylformamide.

8. Method according to claim 5 in which the solution of the said precursor is applied uniformly or in a pattern to the hydrogel by screen printing, pad printing, or ink jet printing.

9. Method according to claim 6 in which the water-insoluble precipitate is barium sulphate, aluminum hydroxide, or zinc hydroxide or a mixture thereof.

10. Method according to claim 5 in which the dyestuff is applied uniformly or in a pattern by screen printing, pad printing or ink jet printing.

* * * * *